(12) United States Patent
Morimoto et al.

(10) Patent No.: US 10,184,424 B2
(45) Date of Patent: Jan. 22, 2019

(54) CYLINDER HEAD GASKET AND METHOD OF MANUFACTURING THE SAME

(71) Applicant: NOK CORPORATION, Tokyo (JP)

(72) Inventors: Takeo Morimoto, Makinohara (JP); Misaki Gushiken, Makinohara (JP); Namieki Osawa, Makinohara (JP)

(73) Assignee: NOK Corporation (JP)

( * ) Notice: Subject to any disclaimer, the term of this patent is extended or adjusted under 35 U.S.C. 154(b) by 42 days.

(21) Appl. No.: 15/100,537

(22) PCT Filed: Dec. 10, 2014

(86) PCT No.: PCT/JP2014/082678
§ 371 (c)(1),
(2) Date: May 31, 2016

(87) PCT Pub. No.: WO2015/093368
PCT Pub. Date: Jun. 25, 2015

(65) Prior Publication Data
US 2016/0298573 A1    Oct. 13, 2016

(30) Foreign Application Priority Data
Dec. 18, 2013    (JP) .................................. 2013-261021

(51) Int. Cl.
*F02F 11/00* (2006.01)
*F16J 15/08* (2006.01)
(Continued)

(52) U.S. Cl.
CPC .............. *F02F 11/002* (2013.01); *F02F 1/10* (2013.01); *F02F 1/24* (2013.01); *F16J 15/0825* (2013.01); *F02F 2200/00* (2013.01)

(58) Field of Classification Search
CPC .... F02F 11/002; F02F 1/10; F02F 1/24; F02F 2200/00; F16J 15/0825
See application file for complete search history.

(56) References Cited

U.S. PATENT DOCUMENTS 5,213,344 A    5/1993 Udagawa
5,853,175 A *  12/1998 Udagawa ............. F16J 15/0825
                                                         277/595
(Continued)

FOREIGN PATENT DOCUMENTS

CN    1096086 A    12/1994
CN    1151492 A     6/1997
(Continued)

OTHER PUBLICATIONS

Extended European Search Report for Application No. EP 14 87 2304 dated Oct. 21, 2016 (9 pages).

*Primary Examiner* — Joseph Dallo
*Assistant Examiner* — Kurt Liethen
(74) *Attorney, Agent, or Firm* — Harness, Dickey & Pierce, P.L.C.

(57) ABSTRACT

The invention provides a cylinder head gasket installed by being sandwiched between a cylinder block and a cylinder head of an internal combustion engine. The cylinder head gasket has bore holes each having a circular plane at positions which are lapped over a combustion chamber in said cylinder block, and surface pressure generation portions constructed by three-dimensional shapes surrounding said bore holes at positions which are lapped over partition walls between the combustion chamber in said cylinder block and a water jacket portion. The surface pressure generation portions are arranged at fixed positions in a thickness direction of said partition wall and are arranged closer to the combustion chamber side or the water jacket portion side than the fixed positions in the thickness direction of said partition wall partly on a circumference around the bore holes. Therefore, bore deformation can be reduced.

3 Claims, 6 Drawing Sheets

(51) Int. Cl.
 *F02F 1/10* (2006.01)
 *F02F 1/24* (2006.01)

(56) References Cited

U.S. PATENT DOCUMENTS

| | | | |
|---|---|---|---|
| 6,139,025 | A | 10/2000 | Miyaoh |
| 6,336,639 | B1 | 1/2002 | Ishida et al. |
| 7,234,705 | B2 * | 6/2007 | Novil ................... F16J 15/0825 277/592 |
| 9,127,621 | B2 * | 9/2015 | Hu ........................ F16J 15/0818 |
| 2006/0097460 | A1 | 5/2006 | Udagawa et al. |
| 2009/0200752 | A1 * | 8/2009 | Okano ................. F16J 15/0825 277/592 |

FOREIGN PATENT DOCUMENTS

| | | |
|---|---|---|
| EP | 0369033 A1 | 5/1990 |
| EP | 0 908 648 A2 | 4/1999 |
| EP | 1457718 A1 | 9/2004 |
| EP | 1 672 255 A1 | 6/2006 |
| JP | H05-73361 U | 10/1993 |
| JP | H11-93763 A | 4/1999 |
| JP | H11-118037 A | 4/1999 |
| JP | 2006-161915 A | 6/2006 |
| JP | 2006-342749 A | 12/2006 |
| WO | WO-2009-022635 A1 | 2/2009 |

* cited by examiner

CYLINDER HEAD GASKET AND METHOD OF MANUFACTURING THE SAME

CROSS-REFERENCE TO RELATED APPLICATIONS

This application is a 371 U.S. National Stage Application of International Application No. PCT/JP2014/082678, filed on Dec. 10, 2014, and published in Japanese as WO 2015/093368 A1 on Jun. 25, 2015. This application claims priority to Japanese Application No. 2013-261021, filed on Dec. 18, 2013. The entire disclosures of the above applications are incorporated herein by reference.

BACKGROUND OF THE INVENTION

Field of the Invention

The present invention relates to a cylinder head gasket which is installed while being sandwiched between a cylinder block and a cylinder head in an internal combustion engine, and a method of manufacturing the cylinder head gasket.

Description of the Conventional Art

There has been conventionally known a tabular metal cylinder head gasket 51 which is schematically shown in FIG. 6. A desired number of bore holes 52 having a circular plane surface are provided at a position which is lapped over a combustion chamber in a cylinder block in correspondence to the number of the cylinders, on a plan of the cylinder head gasket 51, and a surface pressure generation portion 55 is provided at a position (a partition wall overlapping portion) 53 which is lapped over a partition wall between a combustion chamber in the cylinder block and a water jacket portion, the surface pressure generation portion 55 being constructed by a three-dimensional shape such as a bead or a step which surrounding the bore holes 52.

A position (a W/J overlapping portion) 54 lapped over the water jacket portion in the cylinder block is drawn by a dotted line in FIG. 6. The partition wall overlapping portion 53 is provided between the W/J overlapping portion 54 and the bore hole 52, and the surface pressure generation portion 55 shown by a single-dot chain line on the drawing is provided in the partition wall overlapping portion 53. Further, a surface pressure generation portion 55 is provided in an outer side of the W/J overlapping portion 54 in order to prevent a cooling water in the water jacket portion from leaking to an external portion of the cylinder block.

The surface pressure generation portion 55 provided in the partition wall overlapping portion 53 is provided as a seal for bore which seals so as to prevent high-pressure gas in the combustion chamber from leaking, and is also provided as a seal for water which seals so as to prevent the cooling water in the water jacket portion from leaking to the bore side. The three-dimensional shape of the surface pressure generation portion 55 includes a shape (a bead type) which is constructed by a bead, and a shape (a stopper type) which is constructed by a shim welded (or folded-back) stopper and forms a step on the basis of a thickness difference.

Further, since the surface pressure generation portion 55 is provided as the seal for bore and the seal for water as mentioned above, the surface pressure generation portion is frequently formed as a double seal line. An inside single-dot chain line in FIG. 6 indicates a first surface pressure generation portion 55A which serves as the former seal for bore, and an outside single-dot chain line indicates a second surface pressure generation portion 55B which serves as the latter seal for water.

The first surface pressure generation portion 55A is formed so as to individually surround a plurality of bore holes 52, and is formed concentrically in relation to the bore hole 52 having the circular plane. The second surface pressure generation portion 55B is formed so as to collectively surround a plurality of bore holes 52, however, is formed concentrically in relation to the bore hole 52 having the circular plane, in the same manner as that of the first surface pressure generation portion 55A in the other areas than intermediate areas between the adjacent bore holes 52 to each other. Further, the partition wall overlapping portion 53 provided with these first and second surface pressure generation portions 55A and 55B is formed concentrically in relation to the bore hole 52 having the circular plane, and is formed into an annular area having a fixed width (a diametrical width) w. Further, since the first and second surface pressure generation portions 55A and 55B are arranged so that their intermediate positions are fixed positions in a width direction of the partition wall overlapping portion 53, and the partition wall overlapping portion 53 is a position which is lapped over the partition wall, the first and second surface pressure generation portions 55A and 55B are arranged so that their intermediate positions are fixed positions in a thickness direction of the partition wall.

In the meanwhile, in the case that the cylinder head gasket 51 is assembled between the cylinder block and the cylinder head and is fastened by bolts, there is generally generated a so-called bore deformation that the cylinder block is deformed by a reaction force of the surface pressure generation portion 55 which is generated in connection with a bolt fastening axial force input. In this regard, it has become a great problem to reduce a friction of an engine, that is, reduce the bore deformation on the basis of demands for improving a fuel consumption in recent years.

In order to reduce the bore deformation, it can be thought to lower a spring constant of the bead type, and reduce an amount of step of the stopper type.

However, the improvement of fuel consumption is demanded more and more severely. Accordingly, if the bead spring constant is further reduced or the amount of step is reduced for further lowering the bore deformation, the sealing surface pressure is lowered more and more, and there is a risk that a sealing performance is adversely affected.

SUMMARY OF THE INVENTION

Problem to be Solved by the Invention

The present invention is made by taking the above points into consideration, and an object of the present invention is to provide a cylinder head gasket which can reduce bore deformation without depending on reduction of a bead spring constant and an amount of step in a surface pressure generation portion, and a method of manufacturing the cylinder head gasket.

Means for Solving the Problem

In order to achieve the object mentioned above, a cylinder head gasket according to a first aspect of the present invention is a cylinder head gasket installed by being sandwiched between a cylinder block and a cylinder head of an internal combustion engine, the cylinder head gasket comprising:

bore holes each having a circular plane at positions which are lapped over a combustion chamber in said cylinder block; and surface pressure generation portions constructed by three-dimensional shapes surrounding said bore holes at positions which are lapped over partition walls between the combustion chamber in said cylinder block and a water jacket portion, wherein said surface pressure generation portions are arranged at fixed positions in a thickness direction of said partition wall and are arranged closer to the combustion chamber side or the water jacket portion side than the fixed positions in the thickness direction of said partition wall partly on a circumference around the bore holes.

Further, a cylinder head gasket according to a second aspect of the present invention is the cylinder head gasket described in the first aspect mentioned above, wherein said surface pressure generation portion has a combination of a first surface pressure generation portion which serves as a seal for bore and a second surface pressure generation portion which serves as a seal for water, and intermediate positions of said first and second surface pressure generation portions are arranged at fixed positions in a thickness direction of said partition wall and are also arranged closer to the combustion chamber side or the water jacket portion side than the fixed positions in the thickness direction of said partition wall partly on the circumference around the bore holes.

Further, a method of manufacturing a cylinder head gasket according to a third aspect of the present invention is a method of manufacturing the cylinder head gasket described in the first aspect mentioned above, the method comprising:

a step of actually measuring bore deformation generated in the cylinder block to which the cylinder head gasket is installed, or estimating the bore deformation on the basis of a simulation;

a step of designing so that the surface pressure generation portion is positioned closer to the combustion chamber side than the fixed position in the thickness direction of said partition wall at a position where the partition wall between the combustion chamber and the water jacket portion in said cylinder block deforms so as to fall down to the water jacket portion side as a result of said actual measurement or the estimating, and designing so that the surface pressure generation portion is positioned closer to the water jacket portion side than the fixed position in the thickness direction of said partition wall at the position where said partition wall deforms so as to fall down to the combustion chamber side;

a step of manufacturing the cylinder head gasket on the basis of said design; and sequentially executing these steps.

Further, a method of manufacturing a cylinder head gasket according to a fourth aspect of the present invention is a method of manufacturing the cylinder head gasket described in the second aspect mentioned above, the method comprising:

a step of actually measuring bore deformation generated in the cylinder block to which the cylinder head gasket is installed, or estimating the bore deformation on the basis of a simulation;

a step of designing so that the intermediate position of the first and second surface pressure generation portions is positioned closer to the combustion chamber side than the fixed position in the thickness direction of said partition wall at a position where the partition wall between the combustion chamber and the water jacket portion in said cylinder block deforms so as to fall down to the water jacket portion side as a result of said actual measurement or the estimating, and designing so that the intermediate position of the first and second surface pressure generation portions is positioned closer to the water jacket portion side than the fixed position in the thickness direction of said partition wall at the position where said partition wall deforms so as to fall down to the combustion chamber side;

a step of manufacturing the cylinder head gasket on the basis of said design; and sequentially executing these steps.

In the case that the cylinder head gasket is assembled between the cylinder block and the cylinder head and is fastened by the bolts as mentioned above, there may be generated the so-called bore deformation that the cylinder block is deformed by the reaction force of the surface pressure generation portion which is generated in connection with the bolt fastening axial force input. In this regard, the present invention aims at reducing the bore deformation as mentioned above.

An aspect of the bore deformation includes a bore deformation that the partition wall between the combustion chamber in the cylinder block and the water jacket portion deforms so as to fall down to the water jacket portion side. In this case, a falling degree of the partition wall can be reduced by arranging the surface pressure generation portion in the gasket closer to the combustion chamber side than the fixed position in the thickness direction. More specifically, since the surface pressure generation portion has been conventionally arranged at the fixed position in the thickness direction of the partition wall, the partition wall has deformed so as to fall down to the water jacket portion side over a certain amount. However, the falling degree of the partition wall is increased by moving the surface pressure generation portion closer to the water jacket portion side than the fixed position in the thickness direction of the partition wall, and the falling degree of the partition wall is reduced inversely by moving the surface pressure generation portion closer to the combustion chamber side than the fixed position in the thickness direction of the partition wall. Therefore, the present invention selects the latter in this case, and the surface pressure generation portion is arranged closer to the combustion chamber side than the fixed position in the thickness direction of the partition wall in the present invention.

Further, a different aspect of the bore deformation includes an aspect that the partition wall between the combustion chamber in the cylinder block and the water jacket portion deforms so as to fall down to the combustion chamber side inversely. In this case, the falling degree of the partition wall can be reduced by arranging the surface pressure generation portion closer to the water jacket portion side than the fixed position in the thickness direction of the partition wall. More specifically, since the surface pressure generation portion has been conventionally arranged at the fixed position in the thickness direction of the partition wall, the partition wall has deformed so as to fall down to the combustion chamber side over a certain amount. However, the falling degree of the partition wall is increased by moving the surface pressure generation portion closer to the combustion chamber side than the fixed position in the thickness direction of the partition wall, and the falling degree of the partition wall is reduced inversely by moving the surface pressure generation portion closer to the water jacket portion side than the fixed position in the thickness direction of the partition wall. Therefore, the present invention selects the latter in this case, and the surface pressure generation portion is arranged closer to the water jacket portion side than the fixed position in the width direction of the partition wall in the present invention.

Since the bore deformation is generated partly on the circumference around the bore hole, the surface pressure generation portion is correspondingly moved (moved in a diametrical direction) only partly on the circumference around the bore hole as mentioned above in the present invention. If the surface pressure generation portion is moved to a position where the bore deformation is not generated, any new bore deformation may be generated, and it is necessary to avoid this factor.

For example, in the case that the bore deformation that the partition wall deforms to fall down is generated in the vicinity of twelve o'clock position on the assumption that the bore hole having the circular plane is a face of a clock, the surface pressure generation portion is moved to the combustion chamber side or the water jacket portion side only in the vicinity of the twelve o'clock position, the surface pressure generation portion is arranged at the fixed position in the thickness direction of the partition wall in the remaining positions, and the surface pressure generation portion in the vicinity of the twelve o'clock position is connected to the surface pressure generation portion in the remaining portion by a smooth curved line. Further, in the case that the bore deformation that the partition wall deforms to fall down is generated in each of the vicinity of the twelve o'clock position and the vicinity of the six o'clock position, the surface pressure generation portion is moved to the combustion chamber side or the water jacket portion side only in the vicinity of the twelve o'clock position and the vicinity of the six o'clock position, the surface pressure generation portion is arranged at the fixed position in the thickness direction of the partition wall in the remaining portion, and the surface pressure generation portions in the vicinity of the twelve o'clock position and the six o'clock position are connected to the surface pressure generation portion in the remaining portion by a smooth curved line. Therefore, in the present invention, the surface pressure generation portion is not formed into the concentrically formed circular shape but is formed into a comparatively irregular shape such as an oval shape, even in the case that the bore hole is formed into the circular plane.

Further, in the case that the surface pressure generation portion is formed into the bead shape having the first surface pressure generation portion serving as the seal for bore which seals the high-pressure gas in the combustion chamber, and the second surface pressure generation portion serving as the seal for water which seals the cooling water in the water jacket portion as mentioned above, the intermediate position of the first and second surface pressure generation portions is moved to the combustion chamber side or the water jacket portion side in relation to the fixed position in the thickness direction of the partition wall. Therefore, the first and second surface pressure generation portions move while keeping a distance between them constant.

Further, since the generation condition of the bore deformation that the partition wall deforms to fall down is different every specifications of the engine, the engine in which the cylinder head gasket is assembled is specified (selected) first of all when the cylinder head gasket is manufactured. Next, the cylinder head gasket in which the conventional type surface pressure generation portion is arranged at the fixed position in the thickness direction of the partition wall is fastened by assembling bolts between the cylinder block of the specified engine and the cylinder head, and the generation condition of the bore deformation is actually measured. In place of the actual measurement, an estimated value may be employed on the basis of a simulation according to an FEM analysis. Next, the arrangement of the surface pressure generation portion is determined over a whole periphery around the bore hole with reference to the actually measured value or the estimated value. Specifically, in the case that the partition wall is deformed so as to fall down to the W/J side, the surface pressure generation portion is arranged closer to the combustion chamber side (the inner side) than the fixed position in the thickness direction of the partition wall, and in the case that the partition wall is deformed so as to fall down to the combustion chamber side, the surface pressure generation portion is arranged closer to the water jacket portion side (the outer side) than the fixed position in the thickness direction of the partition wall. These ways are repeated over a whole periphery of the bore hole while determining a plurality of points, the arranged points of the surface pressure generation portion are determined every points, and the arranged points of the surface pressure generation portion are connected by the smooth curved line. Then, the arrangement of the surface pressure generation portion over a whole periphery like the oval shape which is not a perfect circle is determined. Next, the cylinder head gasket is manufactured on the basis of the determined arrangement of the surface pressure generation portion over a whole periphery. Therefore, according to the present invention, an optimum cylinder head gasket can be manufactured every specification of the engine.

Effect of the Invention

The present invention achieves the following effects.

In the present invention, it is possible to reduce the bore deformation without depending on the reduction of the bead spring constant and the amount of step in the surface pressure generation portion.

BRIEF EXPLANATION OF THE DRAWINGS

FIGS. 2A, 2B and 2C are explanatory views showing a positional relationship of a surface pressure generation portion in relation to a fixed position in a thickness direction of a partition wall in the cylinder head gasket in the same manner, in which FIG. 2A is an explanatory view showing a state in which the surface pressure generation portion is arranged at the fixed position in the thickness direction of the partition wall, FIG. 2B is an explanatory view showing a state in which the surface pressure generation portion is arranged closer to a combustion chamber side than the fixed position in the thickness direction of the partition wall, and FIG. 2C is an explanatory view showing a state in which the surface pressure generation portion is arranged closer to a water jacket portion side than the fixed position in the thickness direction of the partition wall;

FIGS. 4A, 4B and 4C are explanatory views showing a positional relationship of a surface pressure generation portion in relation to a fixed position in a thickness direction of a partition wall in a cylinder head gasket according to the other embodiment of the present invention, in which FIG. 4A is an explanatory view showing a state in which the surface pressure generation portion is arranged at the fixed position in the thickness direction of the partition wall, FIG. 4B is an explanatory view showing a state in which the surface pressure generation portion is arranged closer to a combustion chamber side than the fixed position in the thickness direction of the partition wall, and FIG. 4C is an explanatory view showing a state in which the surface pressure generation portion is arranged closer to a water jacket portion side than the fixed position in the thickness direction of the partition wall;

DETAILED DESCRIPTION OF PREFERRED EMBODIMENTS

The following embodiments are included in the present invention.

(1) In order to reduce the bore deformation in the cylinder head gasket of the conventional bead type or shim welded (folded-back) stopper type, the spring constant is lowered in the bead type and the amount of step is reduced in the shim welded (or folded-back) stopper type. However, the improvement of the fuel consumption has been demanded more and more severely in recent years, and the reduction of the bead spring constant and the reduction of the amount of step are demanded for further reducing the bore deformation (reducing the friction), but both way have backlash (side effects) that the sealing surface pressure is lowered, and there is a limit to reduction of the bore deformation. Therefore, a corresponding technique having no backlash (side effects) of the reduction of the sealing surface pressure is demanded, (2) The present invention pays an attention to a surface pressure generation point (=load generation point) as a factor which can reduce the bore with no backlash (side effects) of the reduction of the sealing surface pressure (=reduction of the bead spring constant and reduction of the amount of step), and employs a method of setting (varying) the surface pressure generation point according to a place while keeping the spring constant and the amount of step so that the bore deformation becomes minimum from the inner side (the bore side) to the outer side (the water jacket side).

(3) The bore deformation is a phenomenon that reaction force is generated in the surface pressure generation portion such as the bead in the cylinder head gasket due to the bolt fastening axial force input and a bending moment is accordingly generated in the bore portion (the partition wall). Further, the bore deformation is determined on the basis of a bending moment input applied to the bore (the partition wall) and a bore rigidity standing against the input. The bending moment input is determined on the basis of a length of application which is defined by the load generated in the bore, a point of application thereof (a load point) and a bolt position, and the cylinder head gasket relates to the position of the load and the point of application (the load point). The present invention achieves the reduction of the bore deformation by changing the point of application (the load point) per each of the cylinders while keeping the load thereof (the sealing surface pressure). More specifically, the present invention is the invention of the cylinder head gasket having such a shape that the surface pressure generation point (the load generation point) is variable.

Embodiments

Next, a description will be given of embodiments according to the present invention with reference to the accompanying drawings.

Figure 1:
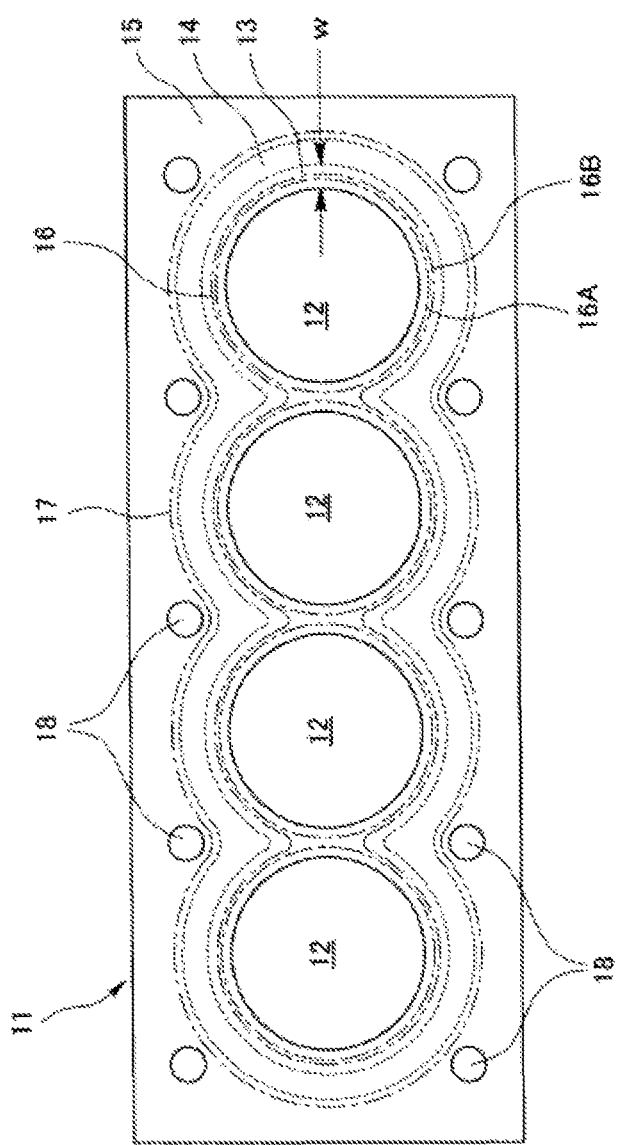
FIG. 1 is a schematic plan view of a cylinder head gasket according to an embodiment of the present invention.

FIG. 1 shows a schematic plane of a cylinder head gasket 11 according to an embodiment of the present invention. The cylinder head gasket 11 according to the embodiment is a tabular metal cylinder head gasket which is installed while being sandwiched between a cylinder block of an internal combustion engine and a cylinder head, and is structured as follows.

More specifically, a desired number of bore holes 12 each having a circular plane are provided at a position which is lapped over a combustion chamber in a cylinder block on a plane of the cylinder head gasket 11 in correspondence to the number of cylinders of the internal combustion engine. Around the bore hole 12, there are provided sequentially in a two-dimensional manner a position (a partition wall overlapping portion) 13 which is lapped over a partition wall between the combustion chamber in the cylinder block and a water jacket portion, a position (a W/J overlapping portion) 14 which is lapped over the water jacket portion in the cylinder block, and a position (an outer peripheral overlapping portion) 15 which is lapped over a block outer peripheral portion in the cylinder block.

In this structure, the partition wall overlapping portion 13 is formed into a concentric circle in relation to the bore hole 12 having the circular plane in correspondence to a cylindrical shape of the partition wall in the cylinder block, and is also formed into an annular area having a fixed width (a diametrical width) w. The partition wall overlapping portion 13 is provided with a surface pressure generation portion 16 formed into a three-dimensional shape so as to surround the periphery of the bore hole 12.

The surface pressure generation portion 16 is obtained by combining a first surface pressure generation portion 16A serving as a seal for bore which seals high-pressure gas in the combustion chamber and provided in an inner side, and a second surface pressure generation portion 16B serving as a seal for water which seals cooling water in the water jacket portion and provided in an outer side, and forms a double seal line.

The outer peripheral overlapping portion 15 is provided with a third surface pressure generation portion 17 formed into a three-dimensional shape so as to surround the periphery of the W/J overlapping portion 14. Further, bolt holes 18, water and oil holes (not shown) and a surface pressure generation portion (not shown) surrounding them are additionally provided.

Figure 2A:
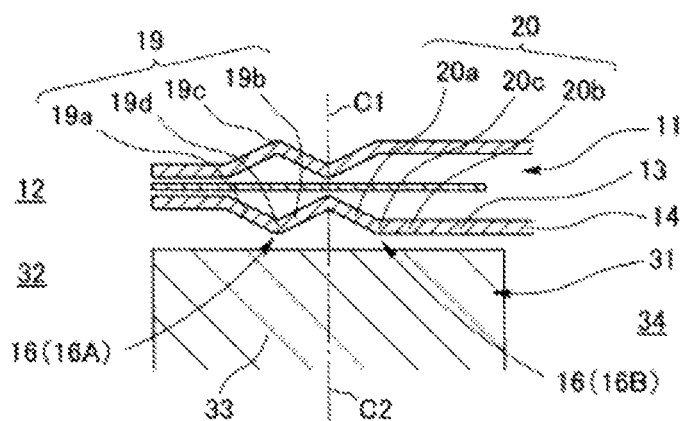

The first surface pressure generation portions 16A existing in the inner side in the surface pressure generation portions 16 provided in the partition wall overlapping portions 13 are formed so as to individually surround a plurality of bore holes 12, and are formed into full beads 19 each of which is constructed by a combination of a pair of inclined surfaces 19a and 19b as shown by a cross sectional view in FIG. 2A. On the other hand, the second surface pressure generation portion 16B existing in the outer side is formed so as to collectively surround a plurality of bore holes 12, and is formed into a half bead 20 which is constructed by a combination of an inclined surface 20a and a flat surface 20b as shown by a cross sectional view in FIG. 2A.

Figure 2B:
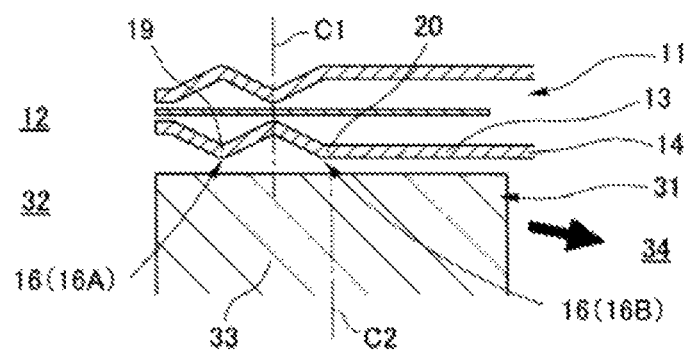
Figure 2C:
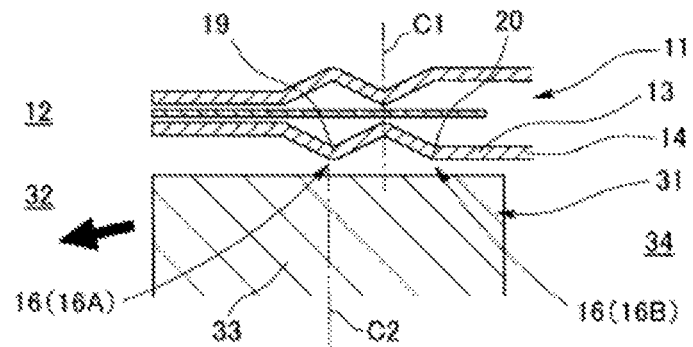

Further, the first and second surface pressure generation portions 16A and 16B are arranged so that an intermediate position C thereof is an intermediate position C2 which is a fixed position in a thickness direction of a partition wall 33 in a cylinder block 31 as shown in FIG. 2A. The intermediate position C1 is arranged closer to a combustion chamber 32 side than the intermediate position C2 in the thickness direction of the partition wall 33 as shown in FIG. 2B partly on a circumference around the bore hole 12, or the intermediate position C1 is arranged closer to a water jacket portion 34 side than the intermediate position C2 in the thickness direction of the partition wall 33 as shown in FIG. 2C partly on the circumference around the bore hole 12. As a result, it is possible to reduce bore deformation which is generated in the cylinder block 31.

More specifically, in the case that the cylinder head gasket is assembled between the cylinder block and the cylinder head and is fastened by the bolts as mentioned above, there may be generated the so-called bore deformation that the cylinder block is deformed by the reaction force of the surface pressure generation portion which is generated in connection with the bolt fastening axial force input.

As the bore deformation, the partition wall 33 in the cylinder block 31 may be deformed so as to fall down to the water jacket portion 34 side as shown by an arrow in FIG. 2B. In this case, a falling degree of the partition wall 33 can be reduced by arranging the intermediate position C1 of the first and second surface pressure generation portions 16A and 16B in the gasket 11 closer to the combustion chamber 32 side than the intermediate position C2 in the thickness direction of the partition wall 33.

Further, as the bore deformation, the partition wall 33 in the cylinder block 31 may be deformed so as to fall down to the combustion chamber 32 side as shown by an arrow in FIG. 2C. In this case, the falling degree of the partition wall 33 can be reduced by arranging the intermediate position C1 of the first and second surface pressure generation portions 16A and 16B closer to the water jacket portion 34 side than the intermediate position C2 in the thickness direction of the partition wall 33.

Figure 3:
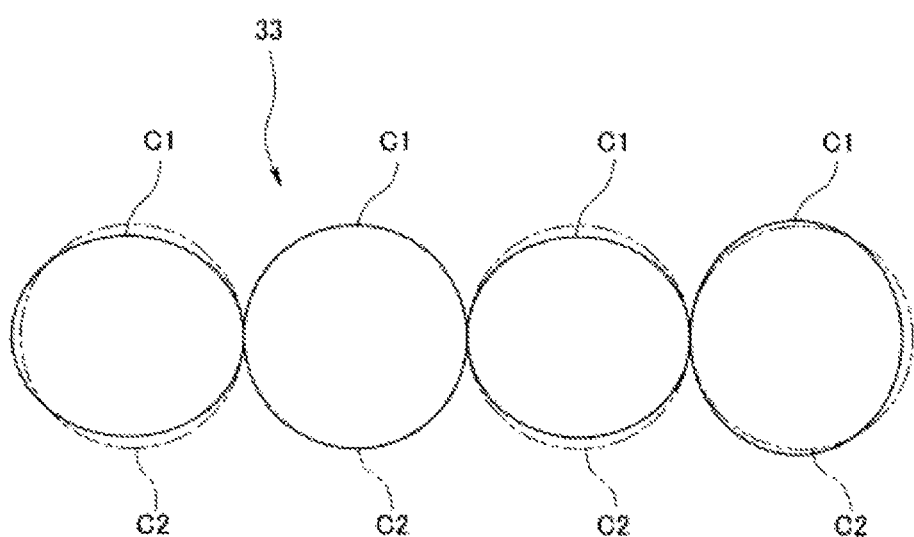
FIG. 3 is an explanatory view showing a positional relationship of the surface pressure generation portion in relation to the fixed position in the thickness direction of the partition wall in the cylinder head gasket.

For example, in the left partition wall 33 among four lined-up partition walls 33 shown in FIG. 3, there is generated the bore deformation that the partition wall 33 deforms to fall down to the water jacket portion 34 side (the outer side) in the vicinity of twelve o'clock position and six o'clock position on the assumption that the bore hole is a face of a clock, and there is generated the bore deformation that the partition wall 33 deforms to fall down to the combustion chamber 32 side (the inner side) in the vicinity of nine o'clock position. Therefore, the intermediate position C1 of the first and second surface pressure generation portions 16A and 16B is arranged closer to the combustion chamber 32 side (the inner side) than the intermediate position C2 in the thickness direction of the partition wall 33 in the vicinity of the twelve o'clock position and the six o'clock position. In other words, a state in FIG. 2B is established. Further, the intermediate position C1 of the first and second surface pressure generation portions 16A and 16B is arranged closer to the water jacket portion 34 side (the outer side) than the intermediate position C2 in the thickness direction of the partition wall 33 in the vicinity of the nine o'clock position. In other words, a state in FIG. 2C is established.

Since the bore deformation is not particularly generated in the partition wall 33 which is second from the left among four lined-up partition walls 33 in FIG. 3, the intermediate position C1 of the first and second surface pressure generation portions 16A and 16B is arranged at the same position as the intermediate position C2 in the thickness direction of the partition wall 33. In other words, the state in FIG. 2A is established.

In the partition wall 33 which is third from the left among four lined-up partition walls 33 in FIG. 3, there is generated a bore deformation that the partition wall 33 deforms to fall down to the water jacket portion 34 side (the outer side) in the vicinity of the twelve o'clock position and the six o'clock position. Therefore, the intermediate position C1 of the first and second surface pressure generation portions 16A and 16B is arranged closer to the combustion chamber 32 side (the inner side) than the intermediate position C2 in the thickness direction of the partition wall 33 in the vicinity of the twelve o'clock position and the six o'clock position. In other words, the state in FIG. 2B is established.

Further, in the partition wall 33 which is the right side among four lined-up partition walls 33 in FIG. 3, there is generated a bore deformation that the partition wall 33 deforms to fall down to the combustion chamber 32 side (the inner side) in the vicinity of the twelve o'clock position and the six o'clock position, and there is generated a bore deformation that the partition wall 33 deforms to fall down to the water jacket portion 34 side (the outer side) in the vicinity of the three o'clock position. Therefore, the intermediate position C1 between the first and second surface pressure generation portions 16A and 16B is arranged closer to the water jacket portion 34 side (the outer side) than the intermediate position C2 in the thickness direction of the partition wall 33 in the vicinity of the twelve o'clock position and the six o'clock position. In other words, the state in FIG. 2C is established. Further, the intermediate position C1 of the first and second surface pressure generation portions 16A and 16B is arranged closer to the combustion chamber 32 side (the inner side) than the intermediate position C2 in the thickness direction of the partition wall 33 in the vicinity of the three o'clock position. In other words, the state in FIG. 2B is established.

Therefore, it is possible to reduce the falling degree in each of four lined-up partition walls 33 according to these structures.

Since a maximum surface pressure is generated in a top portion 19c or a bottom portion 19d between a pair of inclined surfaces 19a and 19b in the full bead 19 constructing the first surface pressure generation portion 16A, the arrangement of the full bead 19 is determined on the basis of the position of the top portion 19c or the bottom portion 19d. Further, since a maximum surface pressure is generated in a corner portion 20c between the inclined surface 20a and the flat surface 20b in the half bead 20 constructing the second surface pressure generation portion 16B, the arrangement of the half bead 20 is determined on the basis of the position of the corner portion 20c. Therefore, the intermediate position C1 of the first and second surface pressure generation portions 16A and 16B means an intermediate position between the top portion 19c or the bottom portion 19d of the full bead 19 and the corner portion 20c of the half bead 20 in the embodiment. Further, although an illustration is omitted, the arrangement is determined on the basis of a position of a step in the case that the surface pressure generation portion is constructed by a shim welded (or folded-back) stopper and the step is formed by difference in thickness.

Next, a description will be given of the other embodiment according to the present invention with reference to the accompanying drawings.

Figure 4A:
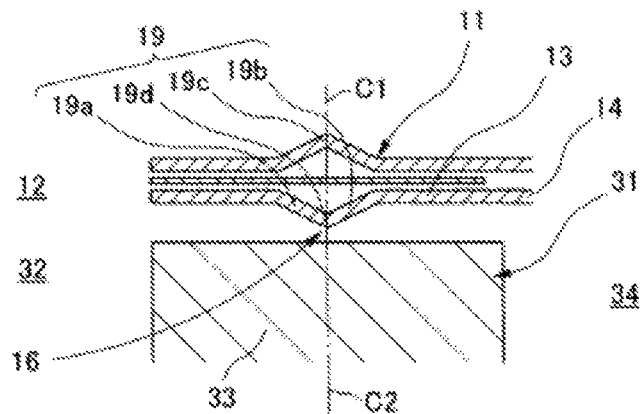
Figure 4B:
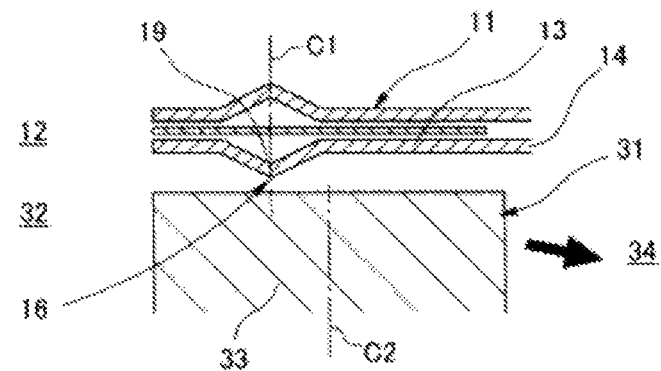
Figure 4C:
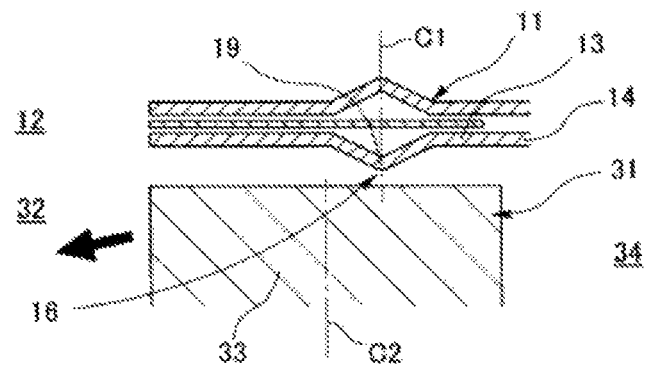

The case that the surface pressure generation portion 16 forms a single seal line in place of the double seal lines will be shown in FIG. 4. Only one three-dimensional shape constructing the surface pressure generation portion 16 is arranged closer to the combustion chamber 32 side or the water jacket portion 34 side than an intermediate position C2 in the thickness direction of the partition wall 33 partly on the circumference, according to a direction of the bore deformation. Since the illustrated example is the full bead 19, the arrangement of the full bead 19 is determined on the basis of the position of the top portion 19c or the bottom portion 19d between a pair of inclined surfaces 19a and 19b.

Further, since the intermediate position C2 in the thickness direction of the partition wall 33 always coincides with an intermediate position in a width direction of the partition wall overlapping portion 13, the intermediate position (the fixed position) C2 in the thickness direction of the partition wall 33 described previously can be explained as the intermediate position (the fixed position) in the width direction of the partition wall overlapping portion 13.

More specifically, even if the intermediate position C1 of the surface pressure generation portion 16 in the gasket 11 is arranged so as to be displaced to the combustion chamber 32 side or the water jacket portion 34 side in relation to the intermediate position C2 in the thickness direction of the partition wall 33, the intermediate position in the width direction of the partition wall overlapping portion 13 in the gasket 11 is not displaced in relation to the intermediate position C2 in the thickness direction of the partition wall 33, but is always arranged at the same position. Therefore, the arrangement of the intermediate position C1 of the surface pressure generation portion 16 in the gasket 11 so as to be displaced to the combustion chamber 32 side or the water jacket portion 34 side in relation to the intermediate position C2 in the thickness direction of the partition wall 33 is synonymous with the arrangement of the intermediate position C1 of the surface pressure generation portion 16 in the gasket 11 so as to be displaced to the combustion chamber 32 side or the water jacket portion 34 side in relation to the intermediate position in the width direction of the partition wall overlapping portion 13.

Further, the surface pressure generation portion or the surface pressure generation point is a position where the maximum surface pressure is generated due to the load application caused by fastening the assembling bolts. Therefore, the surface pressure generation portion or the surface pressure generation point described previously can be reworded as a load portion or a load point.

Next, a description will be given of a method of manufacturing the cylinder head gasket 11 having the structure mentioned above.

Since the generation condition of the bore deformation that the partition wall 33 between the combustion chamber 32 in the cylinder block 31 and the water jacket portion 34 deforms to fall down is differentiated every engine specification as mentioned above, the engine in which the cylinder head gasket 11 is assembled is specified (selected) first of all when the cylinder head gasket 11 is manufactured.

Next, the generation condition of the bore deformation is actually measured by measuring what type of bore deformation is generated in the specified engine, that is, assembling the cylinder head gasket 51 in which the conventional type of surface pressure generation portion 55 is arranged in the intermediate position in the thickness direction of the partition wall 33 between the cylinder block 31 of the specified engine and the cylinder head, and fastening with bolts.

Figure 5:
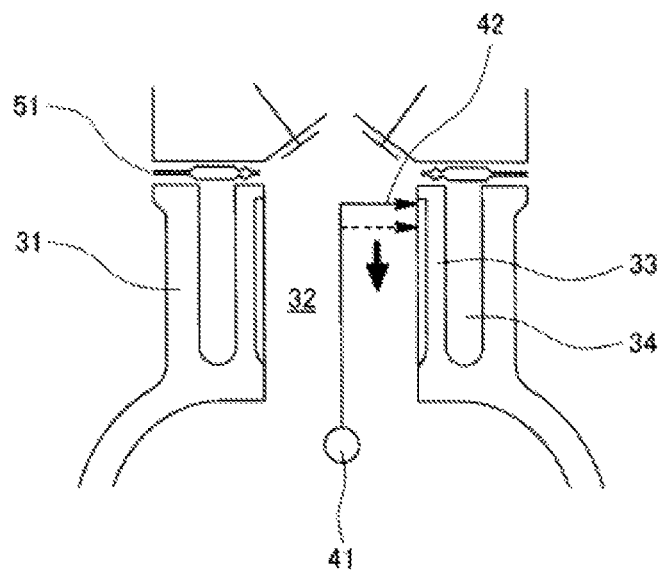
FIG. 5 is an explanatory view showing an example of a method of actually measuring bore deformation.
Figure 6:
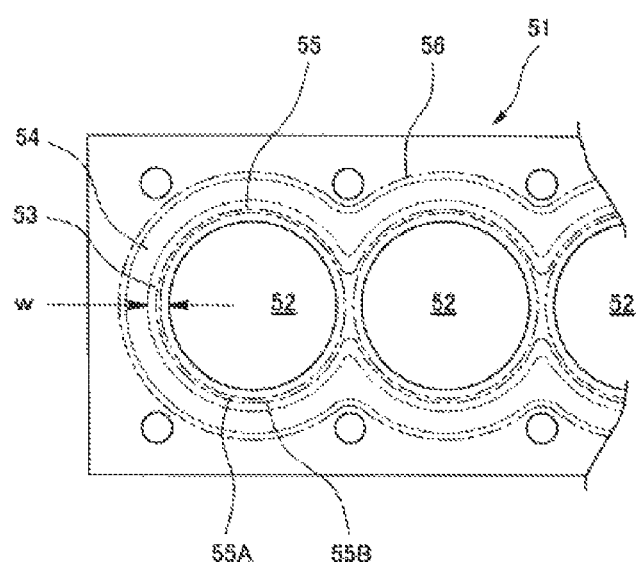
FIG. 6 is a schematically plan view of a cylinder head gasket according to the prior art.

The actually measuring method is carried out by using an inkometer 41, for examples, as shown in FIG. 5, and concavities and convexities are measured every 5 deg (which can be optionally set) by applying a gauge 42 to an inner surface of the partition wall (a bore side wall) 33 and circulating the gauge 42 one circle. Next, the concavities and convexities are measured every 5 deg by applying the gauge 42 to the inner surface of the partition wall 33 and circulating the gauge 42 one circle in the same manner at a place where the gauge 42 is moved 5 mm downward (which can be optionally set), and the falling degree of the partition wall 33 is known as the actually measured value by repeatedly executing these steps to the lower portion of the partition wall 33.

Next, a design for determining the arrangement of the surface pressure generation portion 16 is carried out with reference to the actually measured value mentioned above. More specifically, at the position where the partition wall 33 is deformed so as to fall down to the water jacket portion 34 side as shown in FIG. 2B, it is designed such that the intermediate position C1 of the first and second surface pressure generation portions 16A and 16B is positioned closer to the combustion chamber 32 side than the intermediate position C2 in the thickness direction of the partition wall 33. At the position where the partition wall 33 is deformed so as to fall down to the combustion chamber 32 side as shown in FIG. 2C, it is designed such that the intermediate position C1 of the first and second surface pressure generation portions 16A and 16B is positioned closer to the water jacket portion 34 side than the intermediate position C2 in the thickness direction of the partition wall 33. The other positions are designed in the same manner, and a design drawing of a whole of the gasket is prepared.

Next, the cylinder head gasket 11 is manufactured on the basis of the prepared design drawing.

Therefore, according to the manufacturing method, it is possible to manufacture the optimum cylinder head gasket 11 with regard to the reduction of the bore deformation every specification of the engine, and it is possible to reduce the bore deformation at a rate between about 20 and 30% according to tests which have been carried out by the inventors of the present invention.

What is claimed is:
1. A cylinder head gasket installed by being sandwiched between a cylinder block having a partition wall separating a combustion chamber and a water jacket and a cylinder head of an internal combustion engine, the partition wall having an intermediate position centrally located in a thickness direction of the partition wall, the cylinder head gasket comprising:
  a first plate configured to contact the cylinder block;
  a second plate configured to contact the cylinder head; and
  an intermediate plate positioned between the first and second plates,
  wherein the first, second, and intermediate plates define bore holes each having a circular plane at positions which are lapped over the combustion chamber in the cylinder block;
  the first plate includes:
    a portion adjacent the bore hole that is configured to contact the intermediate plate and extends away from the bore hole and in parallel with the intermediate plate,
    a first inclined surface portion that extends from the portion adjacent the bore hole in a diagonal direction away from the intermediate plate,
    a second inclined surface that extends from the first inclined surface portion in a diagonal direction toward the intermediate plate, a third inclined surface portion that extends from the second inclined surface portion in the diagonal direction away the intermediate plate, and a portion adjacent the water jacket that is configured to contact and extend parallel with the partition wall, the portion adjacent the water jacket extending from the third inclined surface portion toward the water jacket, wherein an apex defined by a connection between the first inclined surface portion and the second inclined surface portion defines a first surface pressure generation portion, and the connection between the third inclined surface portion and the portion that extends toward the water jacket defines a second surface pressure generation portion, the first surface pressure generation portion and the second surface pressure generation portion surround the bore holes at positions which are lapped over the partition wall between the combustion chamber in the cylinder block and the water jacket, and a segment of the first and second surface pressure generation portions along a portion of the circumference of one of the bore holes is arranged at a fixed position along the thickness direction of the partition wall that is arranged either closer to the combustion chamber side from the intermediate position or closer to the water jacket portion side from the intermediate position in comparison to other segments of the first and second surface pressure generation portions located along other portions of the circumference of the one bore hole.

2. The cylinder head gasket according to claim 1, wherein the first surface pressure generation portion serves as a seal for the bore and the second surface pressure generation portion serves as a seal for the water jacket.

3. A cylinder head gasket installed by being sandwiched between a cylinder block having a partition wall separating a plurality of combustion chambers and a water jacket and a cylinder head of an internal combustion engine, the cylinder head gasket comprising:

a first plate configured to contact the cylinder block;

a second plate configured to contact the cylinder head; and an intermediate plate positioned between the first and second plates, wherein the first, second, and intermediate plates define bore holes each having a circular plane at positions that are lapped over the combustion chambers formed in the cylinder block;

the first plate includes at each of the bore holes:

a portion adjacent a respective bore hole that is configured to contact the intermediate plate and extends away from the respective bore hole and in parallel with the intermediate plate, a first inclined surface portion that extends from the portion adjacent the respective bore hole in a diagonal direction away from the intermediate plate, a second inclined surface that extends from the first inclined surface portion in a diagonal direction toward the intermediate plate, a third inclined surface portion that extends from the second inclined surface portion in the diagonal direction away the intermediate plate, and a portion adjacent the water jacket that is configured to contact and extend parallel with the partition wall, the portion adjacent the water jacket extending from the third inclined surface portion toward the water jacket, wherein an apex defined by a connection between the first inclined surface portion and the second inclined surface portion defines a first surface pressure generation portion, and the connection between the third inclined surface portion and the portion that extends toward the water jacket defines a second surface pressure generation portion, the first and second surface pressure generation portions surround the bore holes at positions that are lapped over the partition wall between the combustion chamber in the cylinder block and the water jacket, a segment of the first and second surface pressure generation portions along a portion of the circumference of the respective bore hole is arranged at a fixed position in a thickness direction of the partition wall that is arranged either closer to a combustion chamber side of the partition wall or closer to a water jacket portion side of the partition wall in comparison to other segments of the first and second surface pressure generation portions located along other portions of the circumference of the respective bore hole, the first surface pressure generation portion serves as a seal for the respective bore hole and the second surface pressure generation portion serves as a seal for the water jacket, an intermediate position between the first and second surface pressure generation portions along the segment is arranged at another fixed position in the thickness direction of the partition wall and is also arranged either closer to the combustion chamber side or closer to the water jacket side in comparison to intermediate positions between the first and second surface generation portions of the other segments located along the other portions of the circumference of the respective bore hole, a distance between the first and second surface pressure generation portions is constant, and the intermediate position between the first and second surface pressure generation portions along the segment is positioned closer to the combustion chamber side when the partition wall between the combustion chamber and the water jacket in the cylinder block is deformed in a height direction of the partition wall toward the cylinder block and toward the water jacket side, and the intermediate position between the first and second surface pressure generation portions along the segment is positioned closer to the water jacket side when the partition wall is deformed in the height direction of the partition wall toward the cylinder block and toward the combustion chamber side.

\* \* \* \* \*